Jan. 14, 1969    J. A. M. LEDUC    3,421,994
ELECTROCHEMICAL APPARATUS
Original Filed March 1, 1962

INVENTOR.
JOSEPH ADRIEN M. LEDUC
BY John C. Quinlan
Maylin Klooty
ATTORNEYS

United States Patent Office 3,421,994
Patented Jan. 14, 1969

3,421,994
ELECTROCHEMICAL APPARATUS
Joseph Adrien M. Leduc, Short Hills, N.J., assignor to Pullman Incorporated, Chicago, Ill., a corporation of Delaware
Original application Mar. 1, 1962, Ser. No. 176,534, now Patent No. 3,325,382, dated June 13, 1967. Divided and this application Sept. 27, 1966, Ser. No. 582,446
U.S. Cl. 204—219                                11 Claims
Int. Cl. C23b 5/72

ABSTRACT OF THE DISCLOSURE

Electrochemical apparatus comprising a cell body for containing an electrolyte bath and having a plurality of electrodes vertically disposed therein, the electrodes having respective lower sections comprising an electrode surface adapted to be immersed in the electrolyte bath and respective upper sections having horizontal slots therethrough, the slots of the electrodes of common polarity being aligned in the same horizontal plane, the aligned slots being adapted to receive slidably therethrough at least one electrically conductive bar, the bar being removably secured in place by means of adjustable connectors in association with the upper slotted section, at least one set of electrodes of common polarity being further provided with means for bringing a fluid reactant into contact with the electrode surface to be immersed in the electrolyte bath. An electrochemical cell is also provided having a plurality of electrodes at least one of which comprises two outer porous side walls and an inner chamber adapted to be fed a fluid reactant, the porous side walls of the electrode being separated from the next succeeding electrode by a spacer member provided with inlet and outlet means for introducing and withdrawing electrolyte to and from the space between the opposing electrode surfaces.

---

This application is a division of my prior and copending application Ser. No. 176,534, filed Mar. 1, 1962, now U.S. Patent No. 3,325,382.

This invention relates to an improvement in a process for electrolyzing alkaline earth metal salts in a mercury electrolysis cell. In one aspect this invention relates to a method for recovery of electrical energy expended during the electrolysis of an alkaline metal halide. In another aspect this invention relates to an improved electrochemical apparatus in which amalgams are utilized.

It is known that one method for producing chlorine commercially is the electrolysis of aqueous sodium chloride in a mercury cathode electrolyzer forming sodium amalgam. The amalgam is then passed to a decomposer containing either graphite or iron in which it is treated with water or steam forming sodium hydroxide solution and hydrogen. In contrast to the alkali metal halides, the alkaline earth metal halides are not electrolyzed on a commercial scale in mercury electrolysis cells. There are several reasons for the lack of commercialization of such a process. One reason is that the decomposition of amalgams other than those of the alkali metals in water to form the corresponding hydroxides and hydrogen is a slower chemical reaction. Another reason is the fact that there is only a limited market for alkaline earth metal hydroxides of high purity. A third and related reason is that the economics of the electrolytic process are generally unfavorable. Furthermore, the high power required to operate an electrolysis plant usually necessitates the building and operation of such plants in areas where there is a readily available and low-cost source of electrical energy, thereby placing a very serious limitation on the areas where such plants may be operated.

I have found that the use of alkaline earth metals as fuels in combination with an oxidant provides a fuel cell which is more powerful than presently known fuel cells such as the hydrogen-oxygen power cell or those of the consumable fuel type. Commercial application of my new fuel cell, of course, increases the demand for the alkaline earth metals which, in turn, increases the market for compounds of the alkaline earth metals such as the hydroxides. It is highly desirable, therefore, to provide an improved overall process for the production of alkaline earth metal hydroxides by the electrolysis of salts of these metals.

It is an object of this invention to provide an improved process for the electrolysis of alkaline earth metal salts.

Another object of this invention is to provide an improved process for the electrolysis of alkaline earth metal compounds, particularly the halides, in which a cathode comprising mercury is used.

Another object is to provide a process for the electrolytic production of chlorine and alkaline earth metal hydroxides, whereby the power required from an external source is greatly reduced.

Another object is to provide a method for the recovery of electrical energy expended during the electrolysis of barium halides.

A further object is to provide a process for the production of barium hydroxide by the electrolysis of barium chloride in a mercury cell which process does not require the use of an amalgam decomposer.

A further object is to provide improved means for electrically interconnecting electrodes vertically disposed in an electrochemical cell.

A further object is to provide improved apparatus for electrochemical cells in which a liquid is used as an electrode means or as a reactant in contact with electrode means.

Various other objects and advantages of this invention will become apparent to those skilled in the art from the accompanying description and disclosure.

In accordance with the teachings of this invention, a process is provided which comprises electrolyzing an alkaline earth metal compound in a mercury electrolysis cell forming an amalgam of said alkaline earth metal and utilizing said amalgam to generate electrical energy as a source of power for the electrolysis reaction.

In accordance with one embodiment of the process of this invention, the alkaline earth metal amalgam produced during the electrolysis reaction is reacted electrochemically in combination with an oxidant in a fuel cell containing an aqueous electrolyte bath to (1) generate electrical energy directly from the amalgam, and (2) an alkaline earth metal hydroxide as a second product of the process.

In accordance with another embodiment of this invention a completely regenerative system is provided comprising the electrolysis process in combination with the amalgam fuel cell.

In accordance with still another embodiment of this invention, an improved electrochemical cell is provided which is particularly useful as apparatus in which either electrolysis is effected or in which the energy liberated by a chemical reaction is converted directly into electrical energy.

For the purpose of illustration and convenience, the following remarks are drawn primarily to the electrolysis of barium compounds and to the utilization of barium amalgam. It is to be understood, however, that unless indicated otherwise, the following discussion is also applicable to the electrolysis of the other alkaline earth metals, i.e., strontium and calcium, and to the utilization of amalgams thereof to generate electrical energy for the electrolysis reactions.

This invention is described in detail in conjunction with FIGURES 1–12 of the accompanying drawings.

Figure 1:
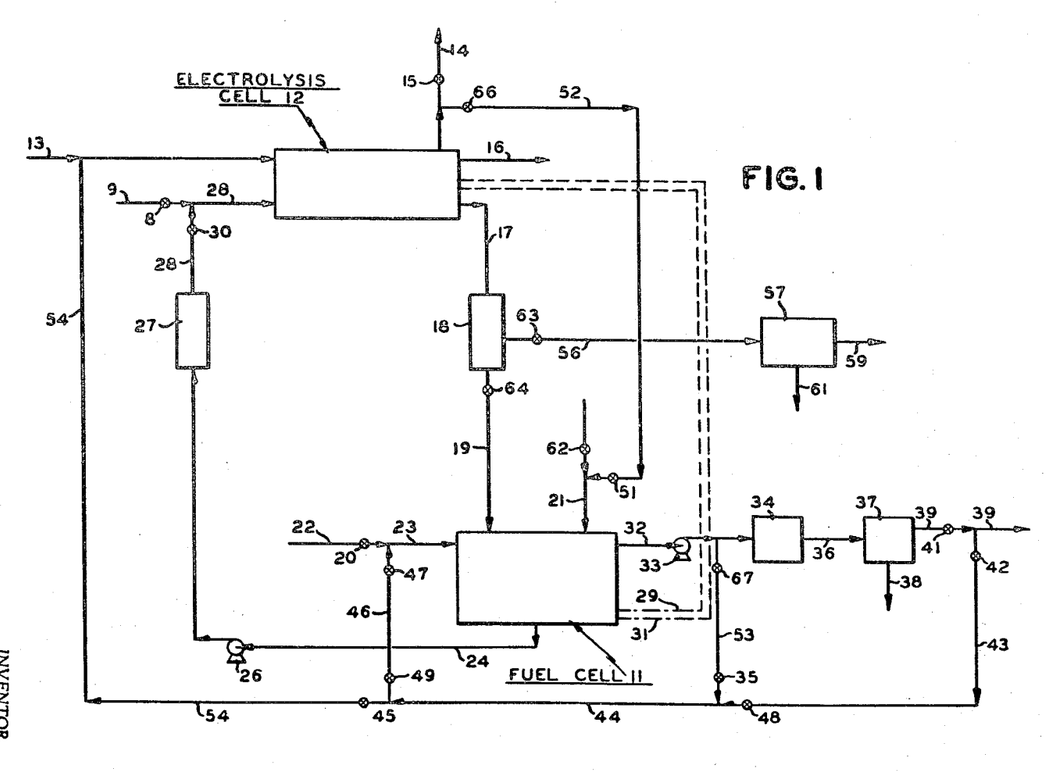
FIGURE 1 illustrates arrangement of suitable apparatus in schematic form which is employed to carry out the process of this invention.

The apparatus shown in FIGURE 1 illustrates the power cell represented schematically by numeral 11 in combination with a mercury cathode electrolysis cell represented schematically by numeral 12. Electrolysis cell 12 is provided with anode means and a mercury cathode in contact with an aqueous solution of a salt of an alkaline earth metal which is charged to cell 12 by means of conduit 13. When chlorine is desired as a product of the electrolysis reaction, a solution of an alkaline earth metal chloride is charged to the cell, and is usually a substantially saturated solution of the chloride such as barium chloride. The electrodes within cell 12 are supplied with an external source of direct current by means of bus bar connections (not shown). The anodes which are in contact with the aqueous electrolyte bath comprise an electroconductive material such as magnetite, graphite or platinized-titanium and are usually composed of graphite or platinized-titanium. The electrolysis cell 12 may be of the horizontal type in which the anodes are suspended in the aqueous electrolyte bath above the surface of mercury flowing horizontally along the lower portion of the electrolyzer. Electrolysis cell 12 also may be of the vertical type in which the cathode comprising mercury is caused to flow downwardly along the surface of rods, tubes or plates composed of steel positioned between the anodes which are in a vertical parallel relationship to the flowing mercury. The cell also may be of the vertical tubular type consisting of a series of tubes positioned within tubular anodes with a space therebetween filled with the electrolyte. In such a cell, mercury or lean amalgam introduced into the inner tube is caused to flow upwardly therein and overflow therefrom in a downwardly direction along the outer surface thereof facing the tubular anode. The electrolysis step of the present process also may be effected in the improved apparatus of FIGURE 9 of the accompanying drawing discussed in more detail hereinbelow.

The electrolysis reaction is conducted within zone 12 at a temperature between about 130° and about 190° F., more usually at a temperature between about 140° and about 170° F., e.g., about 150° F., and usually at substantially atmospheric pressure. Products of this electrolysis reaction are gaseous chlorine which is withdrawn from the cell by means of line 14, and barium metal. The barium metal forms at the surface of the mercury cathode and is dissolved or reacted therein to form barium amalgam. In accordance with one embodiment of the process, depleted barium chloride electrolyte solution is withdrawn from cell 12 by means of line 16 and is passed through a zone (not shown) in which barium chloride is added thereto and purified as may be desired, and recycled to electrolysis cell 12 for reuse therein.

The electrolysis of the barium chloride electrolyte yields barium amalgam containing from about 0.2 to about 1.5 weight percent barium which is withdrawn from cell 12 by means of line 17. In view of the electrical conductivity of the amalgam flowing through line 17, it is necessary to electrically isolate the amalgam from the electrolysis cell in order to prevent short-circuiting. This is accomplished by interrupting the flow of amalgam by any suitable means such as valve or shower head devices, or a combination of umbrellas and perforated plates. For this purpose, conduit 17 has positioned within it amalgam interrupter 18. A convenient design for the interrupter is a shower head device positioned within 18 whereby the continuous stream of amalgam is forced through a number of holes to subdivide it into tiny discrete particles between which there is no electrical contact and is then allowed to flow as a continuous amalgam stream as the amalgam passes from interrupter 18. Another suitable means for instantaneously breaking the flow of amalgam is by means of two automatically controlled valves positioned within line 17. These valves are positioned co-axially and are operated automatically so that the flow of amalgam is interrupted as it passes from the top valve to the lower valve. By such a valve device, the top valve opens as the lower valve closes so that an amalgam slug accumulates between them. The top valve closes automatically as the lower one opens simultaneously and as the amalgam flows through the lower valve the contact between the two valves is broken as well as electrical contact of the amalgam flowing through conduit 17 and out of interrupter 18.

In accordance with one embodiment of this invention, the barium produced in electrolysis cell is used directly as a reactant in the electrical energy producing step. In accordance with this embodiment, the barium amalgam is passed from interrupter 18 through line 19 and is charged to power cell 11 wherein the amalgam is brought into contact with suitable anode means. An oxidant is also charged to fuel cell 11 by means of line 21 and is brought into contact with suitable cathode means. The anode and cathode means are suspended in an aqueous medium contained within cell 11 and charged thereto via line 23.

During operation of power cell 11 the barium metal contained in the amalgam is oxidized to barium ions releasing electrons at the electrode (anode) with which it is brought into contact. The oxidation or anodic reaction which takes place in the fuel cell and the calculated EMF (electromotive force) are as follows:

$$2Ba/Hg \rightarrow 2Ba^{++} + Hg + 4e \qquad E° = 2.24 \text{ volts} \qquad (1)$$

While the barium of the amalgam is being oxidized at the anode, the other reactant or oxidant is being reduced at the other electrode (cathode) and passes into the aqueous medium is negatively charged ions. It is to be understood that, unless indicated otherwise, the term "oxidant" as used herein to described the reactant which is brought into the proximity of the cathode of the fuel cell, is intended to include any agent capable of accepting electrons, and includes oxygen and the halogens (chlorine, bromine, iodine and fluorine). The term "oxygen" as used herein includes pure molecular oxygen as well as oxygen-containing gases such as air and mixtures of oxygen with nitrogen or other inert gases in all mol ratios. Of the oxidants, oxygen and chlorine are preferred.

When oxygen is used as the oxidant, the reduction or cathodic reaction which takes place within fuel cell 11 and the calculated potential thereof are as follows which assumes that no peroxide ion is formed:

$$O_2 + 2H_2O + 4e \rightarrow 4OH^- \quad E° = 0.401 \text{ volt} \quad (2)$$

However, it is known that peroxide ion formation occurs according to the following equation:

$$O_2 + H_2O + 2e \rightarrow HO_2^- + OH^- \quad (3)$$

the theoretical potential of which is minus 0.078 volt. The formation of peroxide ion can be inhibited by the presence of a catalyst in the electrode or aqueous medium such as silver, manganese, nickel, cobalt, iron, rare earth metals, etc. to prevent or decompose the formation of the peroxide ion according to the following equation:

$$HO_2^- \rightarrow OH^- + \tfrac{1}{2}O_2 \quad (4)$$

As the activity or concentration of peroxide is decreased, the potential of the oxygen half cell increases.

The next chemical reaction of the barium amalgam-oxygen fuel cell is:

$$2Ba/Hg + O_2 + 2H_2O \rightarrow 2Ba^{++} + 4OH^- + Hg \quad (5)$$

and the calculated EMF varies approximately between 2.2 and about 2.4 volts depending upon the activity of the various reacting species.

When chlorine is used as the oxidant, the reduction reaction which takes place at the cathode means of fuel cell 11, and the calculated EMF thereof are as follows:

$$Cl_2 + 2e \rightarrow 2Cl^- \quad E° = 1.36 \text{ volts} \quad (6)$$

the net reaction of the barium amalgam-chlorine fuel cell system and calculated EMF thereof being as follows:

$$Ba/Hg + Cl_2 \rightarrow Ba^{++} + 2Cl^- + Hg \quad E° = 3.6 \text{ volts} \quad (7)$$

As the electrochemical reaction proceeds within cell 11, the mercury becomes depleted of barium (about 0.05 weight percent barium or less) and is withdrawn from cell 11 by means of line 24 having pump 26 thereon and is passed to interrupter 27 which serves the same purpose and is one of the types described above in connection with interrupter 18 positioned on line 17. The depleted amalgam is then passed from interrupter 27 through line 28 to electrolysis cell 12 wherein it is reused as the cathode means. Additional mercury is charged to cell 12 as required by means of line 9 having valve 8 thereon.

The power generated by fuel cell 11 is withdrawn therefrom by means of bus bar connections shown schematically as lines 29 and 31 and is used as a source of power required for operation of the electrolysis process.

As indicated above, the electrochemical reactions expressed by the above equations are effected by bringing the barium amalgam derived from electrolysis cell 12 and the oxidant into contact with suitable electrodes in an aqueous medium contained within fuel cell 11 and introduced thereto by means of lines 22 and 23. Although the electrolyte employed in fuel cell 11 may initially be water without an added ionizable compound, for more efficient operation and improved conductivity, at least one water soluble ionizable compound is preferably added as a component of the electrolyte system. When the oxidant introduced through line 21 is oxygen, the aqueous electrolyte is usually alkaline and for this purpose there is used any water soluble compound which when in solution renders the medium alkaline and which does not impair the chemical reactions taking place at the electrode. For example, metal hydroxides such as the alkali metal and alkaline earth metal hydroxides as well as soluble metal oxides, and any combination thereof are suitable. Typical examples of such alkaline producing compounds are sodium hydroxide, potassium hydroxide, lithium hydroxide, barium hydroxide, calcium hydroxide, strontium hydroxide, and soluble oxides such as barium oxide, calcium oxide and strontium oxide.

The initial concentration of the added alkaline compound may vary over a relatively wide range such as from very dilute solutions to saturated solutions, the concentration depending upon the solubility of the particular compound employed. For example, in the case of the alkali metal hydroxides, the concentration thereof may vary between about 0.01 and about 20 molar and is preferably between about 0.1 and about 5 molar. In the case of the less soluble alkaline metal hydroxides such as those of the alkaline earth metals, the concentration employed is usually saturated (from about 0.2 to about 6.0 molar) at the operating temperature of the cell. When barium, for example, is the fuel contained in the amalgam and is used in combination with oxygen as the oxidant, barium hydroxide forms and when saturation is reached, barium hydroxide precipitates from the aqueous medium. When the electrolyte bath contains heavy precipitation, or at any time prior thereto, the aqueous medium containing barium hydroxide is withdrawn from cell 11. This is accomplished by withdrawing the aqueous medium from cell 11 by means of line 32 having pump 33 thereon and passing it to cooler 34 wherein additional barium hydroxide is precipitated, thence to filtration zone 37 by means of line 36. In zone 37, solid barium hydroxide is separated and recovered as a product of the process by means of line 38 while passing the filtrate therefrom by means of line 39.

When the halogens are used as the cathodic reactant or oxidant within cell 11, an electrolyte is usually added to the aqueous medium which yields ions of the same type which are being formed at the cathode. For this purpose, the alkali metal and alkaline earth metal halides are suitable. For example, when chlorine is used as the oxidant, typical examples of suitable added electrolytes are lithium chloride, sodium chloride, potassium chloride, barium chloride, strontium chloride, aluminum chloride and any combination thereof. When the oxidant is a halogen, the aqueous medium may be acidic or alkaline. Alkalinity of the aqueous medium is achieved by the addition thereto of one of the above-mentioned hydroxyl-yielding compounds such as metal hydroxides or oxides, and any combination thereof.

It has been found that when the oxidant is oxygen, the power output of the cell is increased markedly when one of the aforesaid metal hydroxides is used in combination with a metal salt including inorganic and organic salts such as the halides, oxyhalides, thiocyanates and acetates of the alkali metals, the alkaline earth metals and of metals of Group III–A. Typical examples of suitable metal salts are barium chloride, barium thiocyanate, barium chlorate, barium acetate, strontium chloride and calcium chloride. Of these, the alkaline earth metal halides, particularly the chlorides, are preferred. The metal salt, when used, is added in an amount sufficient to yield a concentration of metal ion of between about 0.05 and about 5 molar in combination with a metal hydroxide within the aforesaid concentration, i.e., hydroxyl concentration between about 0.01 and about 20 molar. Within these ranges the power performance of the cell is greatest when the hydroxyl ion concentration of the aqueous medium is between about 0.8 and about 0.2 molar and the concentration of metal ion is correspondingly between about 0.2 and about 1.0 molar. Within these preferred concentrations, the ionic strength of the aqueous medium is about 1 and about 3.

When an alkaline medium containing an added metal salt is used as the electrolyte system within fuel cell 11, such as the combination of sodium hydroxide and barium chloride and when oxygen is used as the oxidant, barium hydroxide forms. When the aqueous medium contains heavy precipitation, or at any time prior thereto, it is withdrawn from cell 11 by means of line 32 and is passed as described above, through cooler 34, line 36 and into filtration zone 37 wherein solids comprising barium hydroxide are separated and withdrawn therefrom by means of line 38. The solids comprising barium hydroxide thus recovered may be passed to a further recovery and purification zone (not shown) in which they are treated to remove any contaminating amounts of residual barium chloride and sodium hydroxide. The filtrate separated from the solids in zone 37 contains barium hydroxide in addition to sodium hydroxide and barium chloride electrolytes and is withdrawn from zone 37 by means of line 39 and, with proper adjustment of valves 41 and 42 on lines 39 and 43, respectively, the filtrate is advantageously recycled to fuel cell 11 by means of lines 43, 44 46 and 23. This solution may first be concentrated in an evaporaton zone (not shown) to reduce the volume of solution recycled, adding make-up water to fuel cell 11 by means of line 22 having valve 20 thereon.

In accordance with another embodiment of the process of this invention, aqueous saturated barium chloride is electrolyzed in electrolysis cell 12 at a temperature of about 160° C., for example, at atmospheric pressure between a graphite anode and a mercury cathode forming chlorine and amalgam containing 1.0 weight percent barium metal. The chlorine is withdrawn from the cell by means of line 14 and at least a portion thereof is passed through line 52 and charged to fuel cell 11 by means of line 21 by proper adjustment of valve 15 on line 14, valves 66 and 51 on line 52, and valve 62 on line 21. In fuel cell 11, chlorine is brought into contact with the gas diffusion electrodes contained therein and used as oxidant. The barium amalgam produced in the electrolyzer is passed through line 17, interrupter 18, line 19 into fuel cell 11 wherein it is brought into contact with anode means as described above. When a completely regenerative system is desired, the electrolyte system which is used in combination with the chlorine oxidant in the fuel cell is aqueous barium chloride, one source of which is the spent aqueous barium chloride solution withdrawn from cell 12 by means of line 16. As the electrochemical reactions of the barium amalgam-chlorine system take place within fuel cell 11, barium ions and chloride ions form thereby enriching the barium chloride content of the electrolyte. When saturation is reached or, at any time prior thereto, the aqueous medium is withdrawn from fuel cell 11 by means of line 32 and is recycled to electrolysis cell 12 by means of line 53, line 44 and line 54 by opening of valves 67 and 34 on line 53, and valve 45 on line 54.

In this manner a completely regenerative and compact system is provided. For example, the process of this invention is operated as a continuous cycle, by using solar energy during the day as the source of energy required chlorine, barium amalgam and spent barium chloride solution which are passed to the fuel cell for use therein to generate power required at night. Such a system is particularly useful in applications where space is limited, or where additional power equipment is undesirable or unavailable.

The temperature at which the fuel cells employed in accordance with the process of this invention are operated ranges between about 20° and about 250° C. The fuel cells also may be operated over a wide range of pressure and generally the pressure is between atmospheric and about 700 pounds per square inch. Any combination of pressure and temperature is employed, with the preferred limitation that they be regulated to maintain the electrolyte in the liquid phase. The preferred operating temperature of the fuel cell ranges between about 20° and about 90° C.

Figure 2:
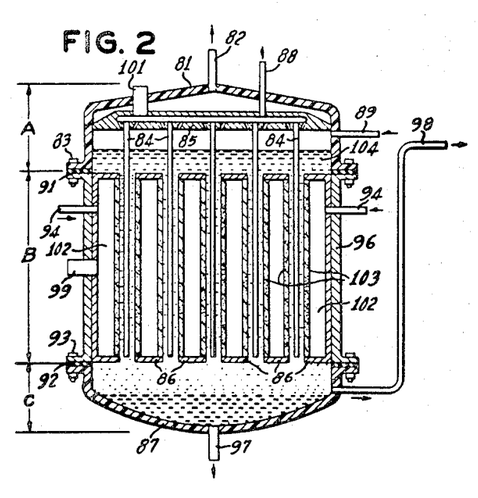
FIGURE 2 represents a longitudinal view in elevation of a fuel cell in which the fuel is utilized in the form of a liquid amalgam.

Reference is now made to FIGURE 2 of the accompanying drawing which illustrates a three-section type of fuel cell comprising an upper section A to which anodes 84 are connected and is also fitted with electrolyte inlet 89; the middle section B within which gas diffusion cathodes 86 are positioned; and lower section C provided with electrolyte outlet 98 and spent amalgam outlet 97. The upper section A and lower section C of the cell are composed of or coated with an electrically non-conductive material whereas the middle section B is made of an electrically conductive material such as steel or other metal. The upper and lower sections are fastened to the middle section by any suitable means such as bolts 83 and 93, respectively, and are insulated from the middle section by means of insulator plates 91 and 92, respectively. The insulator plates are suitably made of hard rubber, polytetrafluoroethylene polymer (e.g., Teflon), polyethylene, polytrifluorochloroethylene polymer (e.g., Kel–F), etc. The cross-section of the cell may be of any desired shape such as rectangular, cylindrical or circular.

Upper section A comprises cell dome or cover 81 and is fitted with horizontal distributor plate 85 connected to barium amalgam inlet 88 and has suspended therefrom a plurality of anodes 84, distributor plate 85 having anode terminus 101 thereon. At least that portion of anodes 84 which is submerged in electrolyte 104 is composed of an electroconductive metal such as steel, stainless steel, nickel, etc. Cell cover 81 also is provided with electrolyte inlet 89 and outlet 82 by means of which water vapor and unreacted gases are vented from the system.

Gas diffusion electrodes 86 are positioned within the middle section B and at least that portion of the gas electrodes which face anodes 84 is composed of a porous electroconductive surface 103. Gaseous oxidant is introduced into inner chamber 102 of the gas electrodes by means of inlet 94 and diffuses through the porous surface 103 towards the aqueous electrolyte. The electro-conductive material through which the gaseous oxidant diffuses is any one of the elements of Groups I–B, II–B, III–VIII, inclusive, of the Periodic Chart of the elements, as well as the rare earth metals and any combination thereof. The conductor may be in the form of sintered powder or specially prepared porous metal or carbon. Also included within the scope of this invention is the use of a gas diffusion electrode comprising the electrically conductive metal including salts, oxides, etc. therefor, homogeneously distributed at least within the pores of an inert substrate such as polyethylene prepared in accordance with the methods described in my prior and co-pending application Ser. No. 162,221, filed Dec. 26, 1961, now U.S. Patent No. 3,235,473. The cathode also may be composed of carbon or graphite, and may contain catalysts such as silver-silver salt additives.

In operating the fuel cell of the accompanying FIGURE 2 in the process shown schematically in FIGURE 1, barium amalgam formed during the electrolysis of the saturated aqueous solution of barium chloride as described above and containing about 0.8 to about 1.0 weight percent barium, for example, is passed from electrolyzer 11 through line 17, interrupter 18 and line 19 and is charged to the fuel cell of FIGURE 2 by means of inlet 88. The amalgam passes through the apertures of plate 85 such that it flows downwardly as a continuous stream along the surface of anodes 84 while oxidant such as gaseous oxygen, for example, is fed to gas diffusion electrodes 86. Aqueous electrolyte comprising a mixture of sodium hydroxide and containing about 0.65 molar hydroxyl ion and 0.44 molar barium ion is charged to the cell by means of inlet 89 in an amount sufficient to fully immerse electrodes 84 and 86. The spent or lean amalgam falls by gravity to the sloping lower surface 87 of the cell. As a pool of spent amalgam accumulates in the bottom of the cell, it is withdrawn therefrom through outlet 97. Electrolyte is withdrawn by means of pipe 98 fitted in the lower portion of the cell and above the spent amalgam which settles to the bottom. The height of the electrolyte within the cell is conveniently controlled by the height of external leveling pipe 98. In operation, the electrodes are preferably totally immersed in the electrolyte which fills part of the top section of the cell. This electrolyte height is controlled by outside overflow from pipe 98 which, as shown in the drawing, extends to the height of electrolyte 104 within the cell. The electrolyte is then passed through external cooling and filtration zones such as zones 34 and 37, respectively, of the above-discussed FIGURE 1.

The power generated by the fuel cell is removed therefrom and used as a source of power for operation of the electrolysis step as described herein, by means of bus bar connections to anode terminus 101 connected to amalgam distributor plate 85 and to cathode terminus 99 connected to the middle metallic section 96.

The fuel cell structure shown in FIGURE 2 is readily disassembled, which feature is particularly advantageous when it becomes necessary to clean the cell, replace component parts and electrodes or transport the cell.

Figure 3:
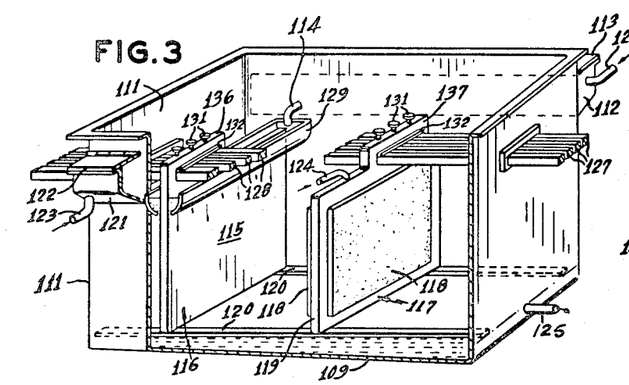
FIGURE 3 represents a three-dimensional view of an electrochemical cell provided with improved bus bar and electrode support means.

The power recovery step of this invention also may be effected in the box-type apparatus illustrated by FIGURE 3 of the accompanying drawings. This fuel cell comprises sides 111 having an opening through the upper portions thereof, side trough 112 to which barium amalgam is introduced by means of pipe 126, side trough 121 to which the oxidant is introduced by means of pipe 123, sloping lower portion 109, cell cover (not shown) and electrolyte inlet and outlet pipes (not shown). Suspended within the cell is a plurality of electrodes of the type typically illustrated by anode 116 and gas diffusion cathode 117. Side trough or amalgam manifold 112 is provided with cover 113, and side trough or oxidant manifold 121 is provided with cover 122 thereby allowing for ready cleaning of the manifolds to remove dust and other contaminants which may accumulate therein. Having the amalgam and oxidant manifolds to the side of the cell body also allows for easier access to the interior of the cell than when the distributing manifolds pass through the cover of the cell body.

As illustrated in FIGURE 3, anode 116 comprises anode plate 115 composed of an electroconductive metal and trough 129 extending across the width of the upper portion thereof, trough 129 having perforations along the width of the bottom thereof in open contact with trough 129 and plates 115. In operation, anodes 116 are fed barium amalgam from side trough 112 by means of individual inlet 114. The amalgam flows through trough 129 and passes through the perforations along the width of trough 129 in a downwardly direction along the vertical surface of anode plate 115. The spent amalgam falls by gravity to the sloping lower surface 109 of the cell body and is removed therefrom by means of the amalgam outlet pipe 125 shown positioned in the lower section. The bottom of the cell also may be shaped such that both sides are lower than the middle section, thereby causing spent amalgam to flow towards and out of both ends of the cell. Electrolyte is removed from the cell by an outlet (not shown) positioned above the level of the pool of amalgam which accumulates in the bottom of the cell.

Figure 4:
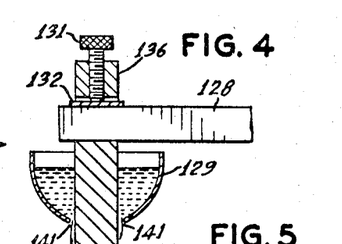
FIGURES 4, 5 and 6 are longitudinal views of electrodes provided with improved means for bringing a liquid into contact with the surface thereof.

FIGURE 4 is a longitudinal view in elevation of anode 116 of FIGURE 3. Inspection of FIGURE 4 shows that the amalgam which is introduced into trough 129 flows through perforations 141 thereof downwardly along anode plate 115. Trough 129 can be of any desired cross-section such as circular as shown in the drawings, rectangular, rhombic, etc.

Figure 5:
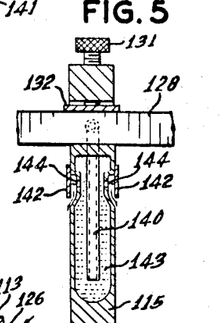
Figure 6:
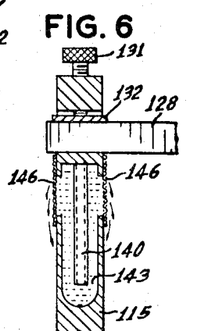

Other suitable means for distributing amalgam downwardly as a continuous smooth film along the surface of the anode plates are shown in the accompanying FIGURES 5 and 6. The anode of FIGURE 5 is partially hollow having chamber 143 within anode plate 115. As shown in the drawing, the upper portion of the anode is recessed with a series of openings or perforations 144 along the vertical portion thereof in open contact with inner chamber 143. Fitted across the width of the upper part of the anode in opposing relationship to the recessed section is metallic plate 142. Plate 142 is fastened to the anode by any suitable means such as bolts or is welded to that portion of the anode above the recessed section. In operation, amalgam is introduced to inner chamber 143 by means of tube 140; this type of anode is advantageously used in the fuel cell of FIGURE 3, for example, in which case tube 140 is charged with amalgam by means of tube 114 which, in turn, is connected to amalgam manifold 112. Pressure which is built up by the head of amalgam within chamber 143 of the anode forces the amalgam through apertures 144. The resultant jet-like stream of amalgam contacts metallic side plates 142, thereby deflecting or diverting the amalgam streams downwardly as a continuous film along the outer vertical surfaces of plate 115.

The anode illustrated in FIGURE 6 is also partially hollow and comprises inner chamber 143 to which amalgam is charged by means of tube 140. Metallic screen 146 is fitted along the upper portion of the anode in open contact with inner chamber 143. In operation, amalgam is introduced to inner chamber 143 such that it is forced through the openings of screen 146, flowing downwardly as a continuous smooth film along the outer vertical surface of anode plate 115.

The types of electrodes shown in FIGURES 5 and 6 are particularly advantageous in view of the fact that the top portion of each has substantially the same thickness as the lower reactive surface thereby enabling the minimum distance to be maintained between the anodes and porous reactive surfaces of the cathodes as the surface of the anode wears and reduces in thickness. Generally, the gap between the electrodes is maintained between about 1 and about 6 millimeters and is usually about 2 millimeters.

Referring again to FIGURE 3, gas electrode 117 comprises two porous conductive surfaces 118 connected to support 119 such that a chamber is enclosed within the electrode. Oxidant, introduced through manifold 121, is passed to the hollow inner chamber of the gas diffusion electrode by means of connecting line 124 and diffuses through porous surfaces 118 towards the aqueous electrolyte in which both the anodes and cathodes are immersed. Porous surfaces 118 of gas electrodes 117 may be porous metal such as a non-amalgamating silver surface, or porous carbon. When composed of porous carbon, it is usually preferred but not necessary, that the carbon have a perforated steel backing which is either part of metal support 119 or is welded thereto.

Electrodes 116 and 117 are supported on support 120 positioned in the lower portion of the cell body. Support 120 is composed of an insulator material or a steel bar having an insulator thereon such as polyethylene.

Although the fuel cell of FIGURE 3 is shown for the sake of simplicity with only one anode and cathode, it is to be understood that the cell is equipped with a plurality of alternating anodes and cathodes. Except for the electrodes at either end of the cell, each cathode, for example, preferably has two reactive porous surfaces 118 as shown in FIGURE 3 serving an anode positioned on either side thereof. Similarly, amalgam is passed downwardly along each vertical surface of the anode which faces the porous reactive surface of a cathode. It is to be understood that amalgam inlet 114 and oxidant inlet 124 may be composed of flexible tubing to facilitate maintenance of the desired distance between the electrodes.

As shown in FIGURE 3 the electrodes typically illustrated by anode 116 and cathode 117 have an upper portion 136 and 137, respectively, with horizontal openings or slots therethrough, the electrodes being retained in position by bars 128 and 127, respectively, said bars being slidably received through the upper slotted portion of the electrodes. The anodes are positioned in such a manner that the slots through the upper portion thereof are aligned so that a common supporting bar or bars may be slipped therethrough. The cathodes are positioned so that the slots thereof are similarly aligned to allow for the insertion of the supporting bars therethrough. The bars, in turn, are locked in place by any type of adjustable connectors such as bolt, screw, clamp or spring devices, attached to the top of the slotted upper portion of the electrodes exerting downward pressure on the supporting bars. The number and size of the supporting bars may vary depending in large part upon the weight and number of the electrodes, but at least one of the supporting bars 128 which passes through and interconnects the individual anodes, and similarly at least one of supporting bars 127 which is common to the cathodes is an electrically conductive material such as copper, thereby having the dual function of a supporting bar and a bus bar. The other bars may similarly function as bus and supporting bars, or may be composed of a material providing additional support for the respective electrodes.

As shown in the drawing, bars 127 which are common to the cathodes extend through an opening in the side wall 111, there being an insulating material at least between the bars and that portion of the side wall in contact therewith. Similarly, bus bars 128 which are common to each of the anodes pass through the other side wall which also has an opening therethrough insulated from the bars. It is to be understood that the anode and cathode bus bars may extend through the same side of the cell without departing from the scope of this invention.

Figure 7:
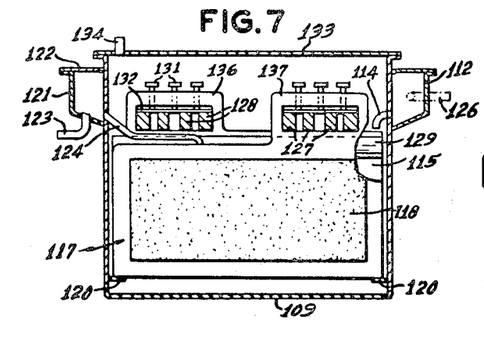
FIGURE 7 is a side view of the improved bus bar and electrode supporting means of FIGURE 3.

FIGURE 7 is a side view in elevation of the fuel cell of FIGURE 3 using the same numerals to designate the parts shown in the three-dimensional view. The side view also shows the cell provided with cell cover 133 having vent 134 thereon. FIGURE 7 shows in greater detail the slotted upper portions 136 and 137 of the anode and cathode, respectively. There is a slight difference in the height of the anodes with respect to the cathodes in order that busses 128 which interconnect the anodes do not contact the cathodes. It is seen that supporting or bus bars 127 and 128 are held in position by a screw device 131 which exerts pressure on pressure plate 132 thereby locking the supporting bars in position.

Figure 8:
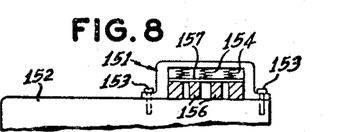
FIGURE 8 is a side view of a modification thereof.

A variation of means for locking the supporting or bus bars in place is shown in accompanying FIGURE 8. The locking means comprises the hollow frame 151 fastened to the electrode 152 by side bolts 153. Connected to the inside of the frame are flexible means 154 such as coils or springs, connected to pressure plate 157. The supporting bars 156 are slipped through the frame such that they exert pressure upwardly against plate 157 causing spring or coil 154 to contract, thereby locking the bars in position by downward pressure thereon. The same downward pressure is obtained by first placing the bus bars across the electrodes, positioning the frame thereover and bolting it in place. It is to be understood that upper slotted portion of the electrodes may be a combination of the type shown in FIGURES 7 and 8. In accordance with this embodiment the frame is bolted to the electrode as shown in FIGURE 8 or held in place by some other suitable device such as clamp means, and the bus bars are locked in position by the screw means shown in FIGURE 7 rather than the flexible coil illustrated in FIGURE 8.

In order to prevent corrosion and minimize IR drop across the points of contact between the bus bars and pressure plates such as plates 132 and 157 of FIGURES 7 and 8, respectively, either the bus bar or plates are silverized at the point of contact, or silver foil is placed therebetween.

In conventional arrangement of electrodes, each electrode is usually provided with an individual means such as an electrical connector or stud. Such connection is often welded to each electrode being an integral part thereof. The prior art method of withdrawing electrical energy from the fuel cell requires, in addition to the individual electrode connectors, cross members on top or to the side of the unit to link the individual electrode connectors and carry the electrical energy outside the cell. This results in a network of busses or bars and as many individual connections as there are electrodes. In addition, separate means are required for supporting the electrodes within the cell. On the other hand, the bus and supporting bar arrangement of this invention avoids the disadvantages inherent in prior art methods and the necessity for providing the individual electrodes with individual electrical connectors, and offers the further advantages of facilitating replacement of electrodes and movement thereof as the reactive surfaces reduce in thickness.

Although the apparatus of the accompanying FIGURE 3 has been described with particular reference to use in the power recovery step of the process of this invention, it has other applications. Thus it also is improved apparatus for other fuel cells in which any liquid fuel is brought into contact with the anode means while a gaseous oxidant is used as the cathodic reactant. In applications of the apparatus of FIGURE 3, apart from use in the process of this invention, other liquids such as liquid hydrocarbons, alcohols or sodium amalgam are brought into contact with anodes 116 of FIGURE 3, or with the modifications thereof illustrated by FIGURES 4 and 5, while a gaseous oxidant is passed through gas diffusion electrodes 117.

Similarly, the apparatus of FIGURE 3, with certain modifications, is also useful as an electrolysis cell such as one in which the electrolysis step of the process of this invention is effected, or as an electrolysis cell in which the alkali metal halides such as aqueous sodium chloride, are electrolyzed using a cathode comprising mercury. For example, in the electrolysis of an aqueous barium chloride solution using electrode means comprising mercury, depleted barium amalgam from the barium amalgam fuel cell in combination therewith is brought into contact with electrode 116 of FIGURE 3, or with the electrodes illustrated by FIGURES 5 and 6. Inasmuch as the barium ions of the electrolyte solution are reduced at the surface of the lean amalgam during the electrolysis, electrode 116 functions as the cathode distributing means instead of as the anode distributing means such as when the apparatus is used as a fuel cell. In addition, that portion of electrodes 117 of FIGURE 3 which is immersed in the electrolyte need not be of the gas diffusion type but is instead an electrically conductive plate which functions as the anode means. Thus when the apparatus of FIGURE 3 is used as an electrolysis cell, bus and supporting bars 128 pass through the upper slotted portions of what are now cathodes 116 and interconnect each of the cathodes vertically suspended within the cell. Similarly, bus and supporting bars 127 pass through the upper slotted neck portions of what are now anodes 117 and interconnect each of the anodes vertically suspended within the cell. It is evident that when used in an electrolysis cell, the power required to effect electrolysis is carried to the electrodes by means of bars 127 and 128 instead of being withdrawn therefrom as in the case of application as a fuel cell.

It is to be further understood that although the apparatus of FIGURE 3 is useful as a fuel cell of the liquid fuel-gaseous oxidant type, and as an electrolysis cell in which the cathode means comprises mercury, the improved means for interconnecting electrodes shown therein, as well as the modification thereof illustrated by FIGURE 8, constitute improved bus bar and supporting means for any electrochemical cell having a plurality of electrodes vertically disposed therein irrespective of the nature of the electrochemical reaction taking place within the cell.

Figure 9:
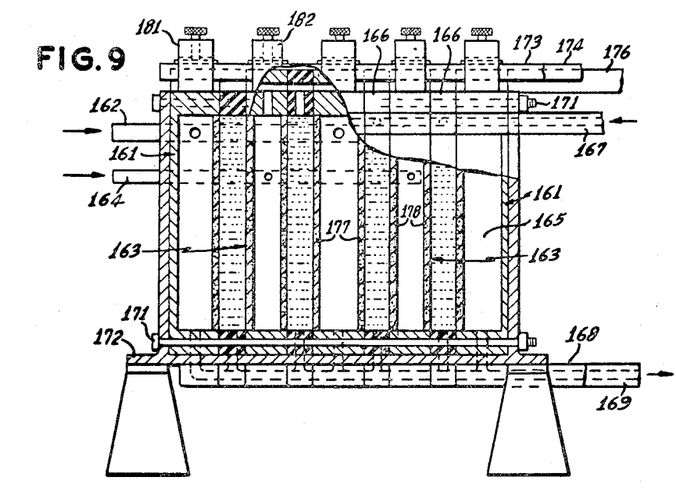
FIGURE 9 presents a longitudinal view of apparatus useful either as an electrolysis cell in which mercury or lean amalgam is used as the cathode means or as a fuel cell in which a liquid amalgam is used as the carrier of the fuel.

Another improved apparatus in which the power recovery step of the process of this invention is effected is illustrated by FIGURE 9 of the accompanying drawings. This cell comprises anodes 161 to which rich liquid barium amalgam from the electrolysis step is fed by means of distributing manifold 162; gas diffusion cathodes 163 to which gaseous oxidant is fed from manifold inlet 164; electrode spacers 166 which also serve as the means for charging the cell with aqueous electrolyte from electrolyte inlet pipe 167; amalgam outlet 168 by means of which spent amalgam is withdrawn from anodes 161; electrolyte outlet 169 by means of which electrolyte is withdrawn from spacers 166; and pipe 176 by means of which unreacted gases and water vapor are vented from the system. Anodes 161, cathodes 163 and spacers 166 are fastened together by means 171, the cell being supported on base plate or frame 172.

Spacers 166 positioned between each of the electrodes comprise an open frame made of an insulator material such as hard rubber or plastic and serve not only to maintain the desired space or gap between the electrodes but also function as electrical insulation between the anodes and cathodes. As shown, spacers 166 are provided with openings in the upper and lower portions thereof by means of which the aqueous electrolyte bath is introduced to the gap between the electrodes from inlet 167 and by means of which electrolyte is withdrawn therefrom by outlet 169, respectively.

Gas diffusion cathodes 163 comprise electrically conductive porous surfaces 178 on either side of the inner chamber enclosed by upper and lower electrically conductive cross members, there being electrical conductivity between the upper members and cathode bus bars 174 which pass through the upper slotted neck portions 182 of the cathodes. The gaseous cathodic reactant is introduced to the inner chamber from inlet 164.

As shown in FIGURE 9, each of anodes 161 contains a hollow inner chamber 165 into which barium amalgam is introduced from inlet 162 and that portion of the anode which faces the porous surface of gas electrodes 163 comprises porous surface 177. Porous surface 177 may be electrically conductive as shown in the drawing, partially conductive, or substantially non-conductive. Thus, porous surface 177 may be composed of a porous metal such as nickel, or stainless steel, or it may comprise a porous substantially non-conductive substrate such as a plastic (e.g., polyethylene) which has been metallized. Porous surface 177 also may comprise a combination of an inner metallic or metallized porous layer in open contact with the amalgam, and an outer non-metallic porous plastic layer in open contact with the electrolyte. When porous surface 177 is composed of a substantially electrically non-conductive material such as porous polyethylene, a metallic screen is positioned vertically within inner chamber 165 to provide electrical conductivity between the amalgam and the upper metallic cross member of the anode, there being electrical conductivity between the upper cross member and bus bars 173 slidably received through the upper slotted neck portion 181 of each of anodes 161.

Thus it is seen that in the fuel cell of FIGURE 9, the barium amalgam does not flow in open contact with the electrolyte. Instead the amalgam contacts the electrolyte within the multiple pores of porous surface 177, the barium metal dissolved in the amalgam being converted to positively charged ions at the amalgam-electrolyte interface within the pores. It is apparent, therefore, that porous surface 177 has the multiple functions of providing the reactive surface for the anodic oxidation of the fuel, of preventing flow of amalgam in open contact with the electrolyte, and of permitting transport or diffusion of the positively charged barium ions from the amalgam-electrolyte interface within the pores to the aqueous electrolyte bath between the electrodes.

Figure 10:
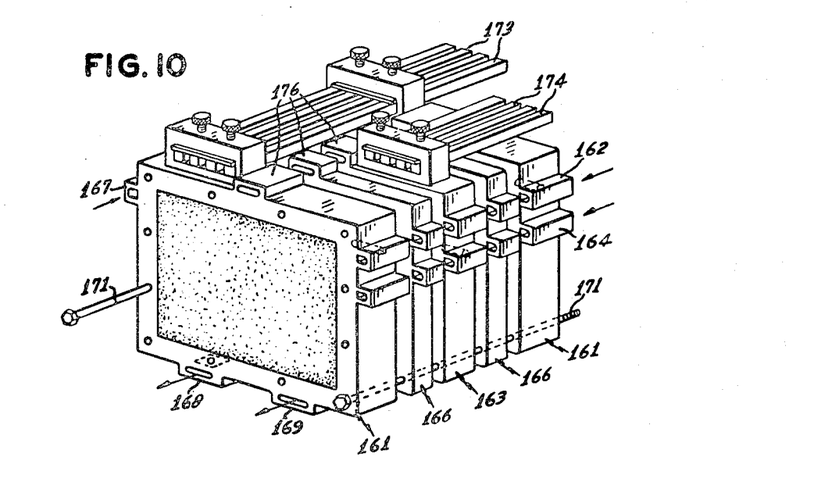
FIGURE 10 is a three-dimensional and exploded view of the apparatus illustrated by FIGURE 9.

A three-dimensional view of the fuel cell of FIGURE 9 is shown in FIGURE 10, using the same numerals to designate the various component parts. As shown in FIGURE 10, anodes 161 and cathodes 163 are separated by spacers 166. When the parts are fastened together by means 171, the various parts of each of the inlets, outlets (including vent 176) are brought together forming continuous manifolds which have openings only to the appropriate part. Thus when the parts shown in FIGURE 10 are brought together, oxygen inlet 164 forms a continuous manifold with openings only to the inner hollow section or chamber of gas electrodes 163. Similarly, amalgam inlet 162 has openings only to the interior of anodes 161. Likewise the electrolyte is only allowed to flow from electrolyte inlet 167 through the frame of spacer 166, i.e., the electrolyte flows between the outer porous surfaces of the anodes and cathodes which the spacers separate. It also is apparent from FIGURE 10 that the amalgam outlet 168 and electrolyte outlet 169 are connected to anodes 161 and to the lower portion of spacers 166, respectively. Anodes 161 and cathodes 163 are electrically interconnected by bus bars 173 and 174, respectively, using the means for locking the bars in position as described in detail hereinabove in connection with FIGURES 3, 7 and 8. The upper neck sections of the electrodes also may be separable members fastened to the electrodes by the side bolt means illustrated by FIGURE 8.

It is apparent that when the barium amalgam-oxidant fuel cell designated schematically by numeral 11 of FIGURE 1 is of the type shown by FIGURE 9, barium amalgam inlet manifold 162, oxidant inlet 164 and aqueous electrolyte inlet 167 of FIGURE 9 are fed with the respective reactants from lines 19, 21 and 23, respectively, of FIGURE 1. Similarly, amalgam outlet 168 and electrolyte outlet 169 of FIGURE 9 are connected to lines 24 and 32, respectively, of FIGURE 1.

Although the apparatus of accompanying FIGURE 9 has been described with particular reference to use in the power recovery step of the process of this invention in which barium amalgam derived from the electrolysis of barium chloride solution is used as the anodic reactant, it has other useful applications. Thus, it also is improved apparatus for other fuel cells in which any liquid fuel is brought into contact with the anode means while a gaseous oxidant is used as the cathodic reactant. For example, in applications of the apparatus of FIGURE 9, apart from use in the process of this invention, other liquids such as liquid hydrocarbons, alcohols or sodium amalgam are introduced into the inner chamber of electrodes 161, while a gaseous oxidant is charged to gas diffusion electrodes 163.

The apparatus of FIGURE 9 offers particular advantages as a fuel cell which is used in applications wherein the cell is subjected to movement in a longitudinal or latitudinal direction. The fuel cell is subjected to such motion, for example, when used as a source of underwater power, mobile land power or as a source of power for operation of air-borne vehicles. The advantage for such applications, is that substantially all of the liquid fuel is retained within the inner chamber of electrodes 161 by rigid porous surfaces 177 and is thereby prevented from leaving the surface of the anode and contacting the gas electrodes. The apparatus of FIGURE 9 thereby allows for continuous and even generation of electrical energy while the fuel cell is subjected to movement. In such applications it is especially preferred that the inner portion of porous surface 177 of electrodes 161 be composed of relatively coarse pores and that the outer surface in open contact with the electrolyte be composed of finer pores. In this manner, an adequate area of liquid fuel-electrolyte interface is made available and the natural tendency of some of the liquid amalgam, for example, to diffuse to the outer surface is minimized.

The apparatus of FIGURE 9 with certain modifications also constitutes an improved electrolysis cell for effecting the electrolysis step of the process of this invention, or as an electrolysis cell in which alkali metal halides such as sodium chloride are electrolyzed using a cathode comprising mercury. When used as a chlorine cell, for example, the apparatus is modified to the extent that the portion of electrodes 163 comprising porous surfaces 178, is replaced with plates composed of graphite or platinized-titanium. During the electrolysis, electrodes 163 function as the anodes and electrodes 161 function as the cathodes. For example, in using the apparatus of FIGURE 9 as the means in which the electrolysis step of the process of this invention is effected, an aqueous saturated solution of barium chloride is charged to the cell by means of inlet 162 such that the space between electrodes 161 and electrode plates 163 is filled with solution. Lean barium amalgam derived from the barium amalgam-oxidant fuel cell, is charged to the inner chamber of electrodes 161 from inlet pipe 162. Current is supplied to the electrodes by means of bus bars 173 which interconnect electrodes 161, and bus bars 174 which interconnect electrode plates 163. During the electrolysis of the barium chloride solution, barium ions migrate to porous surfaces 177 of electrodes 161 and diffuse into the pores being reduced to barium metal at the electrolyte-amalgam interface within the pores. The barium metal dissolves in the amalgam and the enriched amalgam flows from inner chamber 165 into amalgam outlet 168 and is passed to the barium amalgam-oxidant fuel cell for reaction therein. The chlorine which is generated at the surface of the electrode plates of electrode 163, is conveniently discharged from the cell through pipe 176. Spent electrolyte is withdrawn from the cell by means of outlet 169.

In effecting electrolysis in the apparatus of FIGURE 9, it is seen that, as in the case of its application as a fuel cell, the amalgam does not flow in open contact with the aqueous electrolyte but is instead retained within the rigid porous surfaces of electrodes 161. In addition to the advantages of the apparatus as discussed herein with respect to its use as a fuel cell, another advantage is that the generation of hydrogen during electrolysis is substantially eliminated. In prior art cells, particularly of the horizontal type, it is known that metal impurities contained in the solution being electrolyzed (e.g., brine) agglomerate on the surface of the amalgam as it flows across the cell causing the generation of hydrogen along the alkaline surface of the amalgam in open and direct contact with the aqueous electrolyte. The presence of hydrogen in a chlorine cell is not only dangerous, there being a maximum tolerable amount, but even at tolerable levels the presence of hydrogen in the gaseous chlorine product stream places a burden on subsequent purification and liquefaction of the chlorine product. Another advantage realized by the use of the apparatus of FIGURE 9 as a chlorine cell is that the interface reaction between "amalgam butter" and the aqueous electrolyte is minimized.

The following description is offered as a further understanding of the process of this invention and is not to be construed as unnecessarily limiting thereto.

An aqueous solution containing about 350 grams per liter of barium chloride is electrolyzed between a graphite anode having an area of about 48 square inches and a flowing mercury cathode of the same area. The current intensity is 60–100 amperes at 4.3–4.9 volts, or an average current density of about 1.66 amperes per square inch. The electrolysis is conducted at a cell temperature of about 150° F. Under these conditions, barium amalgam containing about 0.28 weight percent barium is formed. Barium amalgam is then charged to a fuel cell containing an aqueous medium having disposed therein a porous silver cathode of about 1.5 square inches and an anode having a vertical steel surface of the same size. The anode is of the type illustrated by accompanying FIGURE 5. The spacing between the electrodes is about 0.125 inch. The barium amalgam is brought into contact with the outer steel surface of the anode as described above in connection with FIGURE 5, while an oxidant is introduced into the porous gas diffusion cathode such that the pressure of the oxidant at the surface of the cathode is atmospheric. The aqueous medium of the fuel cell is static and is at ambient temperature (25° C.).

Figure 11:
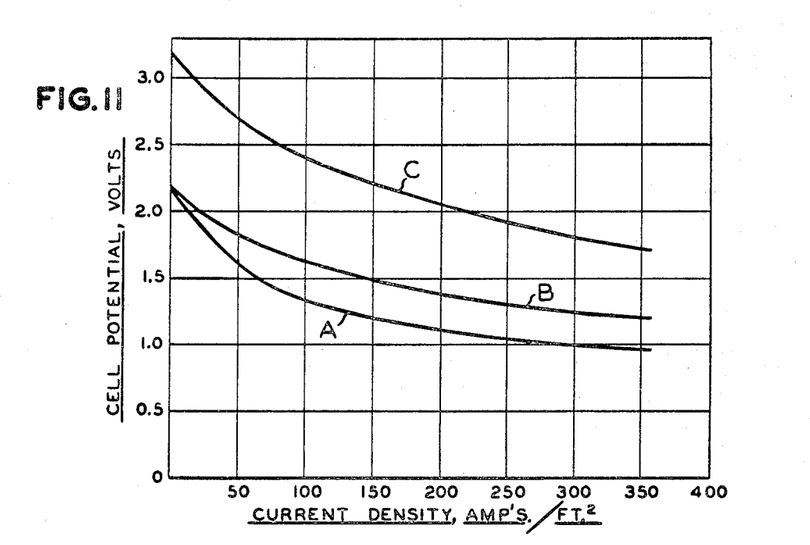
FIGURE 11 shows the voltage characteristics of the fuel cells employed in the process of this invention in which the liquid amalgam of an alkaline earth metal produced in the electrolysis step of the process is utilized.

The graphs of the accompanying FIGURE 11 show a correlation of current density and cell potential of the above barium amalgam-oxidant system, calculated on the basis of the following specific aqueous electrolyte system and oxidant.

(1) Line labeled A of FIGURE 11 illustrates the performance when oxygen is the oxidant and a saturated aqueous solution of barium hydroxide (about 0.22 molar) is the electrolyte.

(2) Line labeled B of FIGURE 11 illustrates the performance when oxygen is the oxidant and an aqueous solution having 0.44 mol per liter of barium chloride and 0.65 mol per liter of sodium hydroxide dissolved therein is the electrolyte.

(3) Line labeled C of FIGURE 11 illustrates the performance when chlorine is the oxidant and an aqueous electrolyte bath contains barium chloride (1.62 molar).

By utilizing the amalgamated barium produced at the cathode of the electrolyzer in the barium amalgam-oxygen fuel cells described herein between about 30 and about 40 percent of the energy expended during the electrolysis process is recovered. For example, inspection of line labeled A of FIGURE 11 shows that at a current density of 100 amperes per square foot, for example, the cell potential of the barium amalgam-oxygen system using a saturated barium hydroxide solution as the electrolyte, is approximately 1.3 volts; therefore, when used in combination with the electrolysis reaction effected at 4.3 volts, the power recovered by the fuel cell at ambient temperature is approximately 30 percent of that expended during the electrolysis. Similarly, inspection of line labeled B of FIGURE 11 shows that in the case of the barium amalgam-oxygen system in which the aqueous medium preferably comprises a metal hydroxide and a metal salt, the cell potential is approximately 1.62 volts at a current density of 100 amperes per square foot, which is a power recovery of approximately 38 percent.

The power recovery is higher in the regenerative system described herein whereby the chlorine produced during the electrolysis of the alkaline earth metal chloride, is used as the oxidant in the fuel cell. For example, inspection of line labeled C of FIGURE 11, shows that the voltage of the barium amalgam chrlorine fuel cell, at 100 amperes per square foot, is about 2.4 volts which represents a power recovery of approximately 57 percent when the electrolysis is effected at a voltage of 4.3 volts.

It is readily apparent, therefore, that by operating the electrolysis of the alkaline earth metal halides in a mercury cell in combination with an alkaline earth metal amalgam-oxidant fuel cell, the electrolysis is rendered a commercially feasible process of overall improved efficiency not only for the generation of gaseous halogen, but also for the production of barium hydroxide which is recoverable directly as a solid product. The combination process of this invention overcomes the disadvantages inherent in the use of an amalgam decomposer which does not, of course, involve the use of an added oxidant as an electrochemical reactant as in the fuel cells described herein, and is thus inherently incapable of generating electrical energy of the order of that generated by the fuel cell.

Figure 12:
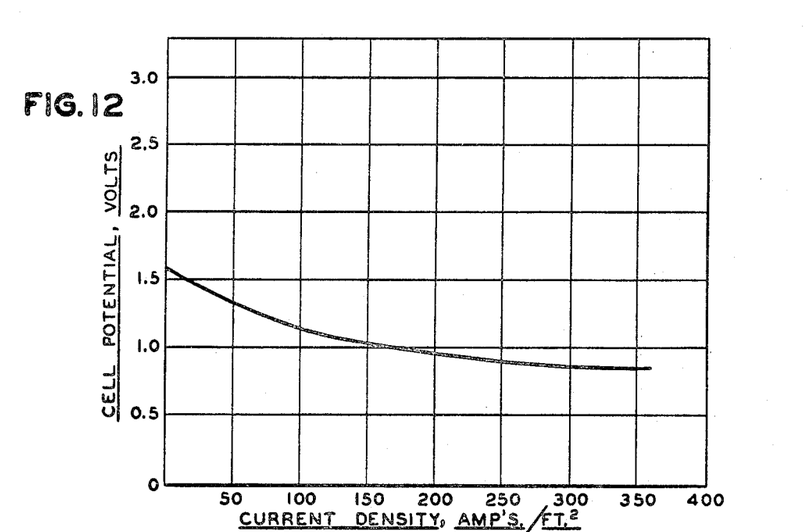
FIGURE 12 shows the voltage characteristics of a fuel cell in which an alkali metal is used in the form of a liquid amalgam.

It is also apparent that by the teachings of this invention, improved apparatus is provided which is useful not only as apparatus in which the electrolysis and fuel cell reactions of the process of this invention are effected, but is also useful as apparatus for the electrolysis of other metal halides and as a fuel cell in which other liquid fuels are used in combination with a gaseous oxidant. Exemplary of another such fuel cell system is the sodium amalgam-oxygen fuel cell, the voltage-current density characteristics of which are illustrated by the graph of the accompanying FIGURE 12. The graph is based on the performance of a fuel cell containing a 50 weight percent aqueous solution of sodium hydroxide having disposed therein a porous carbon gas diffusion cathode and an anode having a vertical steel surface of the same size. Sodium amalgam containing 0.23 weight percent sodium is brought into contact with the vertical steel surface of the anode while gaseous oxygen is passed through the porous cathode, the oxygen pressure at the surface of the cathode being atmospheric. The cell is operated with continuous flow of aqueous electrolyte and at a temperature of about 175° F., the performance of the sodium amalgam-oxygen fuel cell being at an optimum at elevated temperatures.

It is to be understood that various alterations and modifications of the process and apparatus described herein may be made without departing from the scope of this invention. For example, as shown in FIGURE 1, barium amalgam produced in electrolysis cell 12 and passing through line 17 and interrupter 18 may be withdrawn from the interrupter along line 56 having valve 63 thereon, and introduced into zone 57. In zone 57, barium metal may be separated from the amalgam such as by evaporation or distillation and recovered as a product by means of line 61. The spent amalgam is withdrawn from zone 57 by means of line 59 and recycled to the electrolysis cell for use therein as the cathode means. In addition, the barium amalgam may be concentrated in zone 57 to provide higher barium contents. The enriched barium amalgam is then charged to the fuel cell by a line (not shown) to amalgam inlet 23 of fuel cell 11, and brought into contact with anode means therein.

In connection with FIGURE 9, it is to be understood that the electrodes represented by numerals 161 and 163, respectively, may be in the form of tubes positioned one within the other in alternating relationship, having electrolyte flowing in the space between the tubes.

In addition, the gas diffusion electrodes described herein, as well as electrodes 161 of FIGURE 9 with which liquid such as liquid amalgam is contacted, may be of the type comprising a series of contiguous tubes. Such electrodes comprising a porous surface are prepared by molding a flexible porous material into corrugated sheets having a substantially sinuous cross section, aligning the sheets by placing the elevations or peaks of one sheet in opposing relationship to the depressions or valleys of the other sheet such that they are brought into contact and enclose cylindrical voids, and heat sealing the sheets along the vertical plane of contact.

Various alterations and modifications of the teachings of the present invention may become apparent to those skilled in the art without departing from the scope of this invention.

Having described my invention, I claim:

1. A fuel cell in which a liquid fuel is used in combination with a gaseous oxidant to generate electrical energy which comprises in combination a cell body for containing an electrolyte bath, means for maintaining a fixed level of electrolyte bath in said cell body, a plurality of alternately arranged anode and cathode means vertically disposed therein, said anode and cathode means comprising a lower section for contact with said electrolyte bath and an upper section above the level of said electrolyte bath having a horizontal opening therethrough, said anode means being provided with means positioned between said lower and upper sections for bringing a liquid fuel into contact with said lower section, said cathode means having an inner chamber and an outer porous surface and means for introducing a gaseous oxidant into said inner chamber, said anode means being aligned such that said openings thereof are in the same horizontal plane and held in position by at least one electrically conductive bar slidably received through said openings, said cathode means being aligned such that said openings thereof are in the same horizontal plane and in a different vertical plane from the openings of said anode means, said cathode means being held in position by at least one electrically conductive bar slidably received through said openings.

2. An electrolysis cell in which a metal salt is electrolyzed between cathode means comprising mercury and anode means which comprises in combination a cell body for containing a solution of said metal salt, means for maintaining a fixed level of said solution in said cell body, a plurality of alternately arranged anode and cathode means vertically disposed therein, said anode and cathode means each comprising a lower section for contact with said aqueous solution and an upper section above the level of said solution and having a horizontal opening therethrough, said cathode means being provided with means positioned between said lower and upper sections for bringing mercury into contact with said lower section, said anode means being aligned such that said openings thereof are in the same horizontal plane and held in position by at least one electrically conductive bar slidably received through said openings, said cathode means being aligned such that said openings thereof are in the same horizontal plane and in a different vertical plane from the openings of said anode means, said cathode means being held in position by at least one electrically conductive bar slidably received through said openings.

3. In electrochemical apparatus in which a liquid is brought into contact with an electrode vertically disposed therein, the improvement which comprises an electrode having in combination an electrically conductive material having an inner chamber, a metallic screen along the width and upper portion of said electrically conductive material, the apertures of said screen being in open contact with said inner chamber, and means for introducing a liquid into said inner chamber such that the liquid passes therefrom through the openings of said screen downwardly along the outer surface of said electrically conductive material.

4. A fuel cell in which a liquid amalgam is used in combination with a gaseous oxidant which comprises in combination a cell body having at least one anode and at least one cathode vertically disposed therein spaced apart from each other and having aqueous electrolyte therebetween, said anode comprising a rigid porous material and an inner chamber, the outer surface of said porous material being in direct contact with said electrolyte, means for introducing liquid amalgam to the upper portion of said inner chamber and means for withdrawing spent amalgam from the lower portion thereof such that said amalgam flows downwardly within said inner chamber in other than open contact with said electrolyte, the amalgam contacting electrolyte within the pores of said porous surface, said cathodes being provided with means for contacting a gaseous oxidant therewith, and means for withdrawing electrical energy produced by said cell therefrom.

5. An electrochemical cell comprising a cell body for containing a liquid electrolyte medium and having a plurality of electrodes of the same polarity vertically disposed therein, each of said electrodes having an upper section and a lower section, said lower section comprising an electrically conductive electrode surface for immersion in said electrolyte medium, each of said electrodes having means in association therewith for bringing a fluid into contact with said electrically conductive surface for immersion in said electrolyte medium, each of said upper sections comprising a frame having a width less than the width of said lower section, said frame having a slot extending horizontally therethrough, said electrodes being arranged such that the said slots are aligned in the same horizontal plane, the aligned slots being adapted to slidably receive at least one rigid, electrically conductive bar therethrough such that the said electrodes depend downwardly from said bar, said bar being removably secured in place by means of adjustable connectors in association with said frame, the said electrodes being in alternating, spaced relationship to a plurality of electrodes of opposing polarity.

6. An electrochemical cell comprising a cell body for containing a liquid electrolyte bath and having a series of anodes and a series of cathodes vertically disposed therein, the individual anodes and cathodes being alternately arranged, each of said anodes having a lower section comprising an anodic surface for immersion in said electrolyte bath, and each of said cathodes having a lower section comprising a cathodic surface for immersion in said electrolyte bath, the said anodic and cathodic surfaces being arranged in spaced, opposing relationship, each of said anodes and cathodes being provided with an upper slotted portion having a width less than that of said lower section, the electrodes of one of the said series of anodes and cathodes being further provided with means for distributing amalgam downwardly along said surfaces for immersion in the electrolyte bath, said means for distributing amalgam being interposed between the said upper section and said surfaces for immersion in the electrolyte bath, said anodes being arranged such that the slots through the upper sections thereof are aligned in the same horizontal plane, the aligned slots thereof being adapted to receive slidably therethrough at least one rigid, electrically conductive bar, said cathodes being arranged such that the slots through the upper sections thereof are aligned in the same horizontal plane and in a different vertical plane from the slots of said anodes, the aligned slots of the cathodes being adapted to receive slidably therethrough at least one rigid, electrically conductive bar, each of said bars being removably secured in place by adjustable connectors in association with the respective upper sections of the anodes and cathodes.

7. The electrochemical cell of claim 6 in which said means for distributing amalgam comprises a trough along the width of the lower section of the electrode and having openings along the lower surface thereof in fluid communication with the said electrode surface for immersion in the electrolyte bath, said trough being adapted to receive amalgam.

8. In electrochemical apparatus in which a liquid is brought into contact with an electrode vertically disposed therein, the improvement which comprises an electrode having in combination an electrically conductive vertically disposed blade having an inner chamber extending downwardly within the blade, said blade having an apertured recessed portion along the width thereof, the apertures of said recessed portion being in fluid communication with said inner chamber, a metallic plate fastened to said electrically conductive blade above said recessed portion and extending downwardly in opposing relationship to the apertures of said recessed portion of the blade and such that there is an open passageway between the lower end of said metallic plate and the outer surface of the blade, and means for introducing liquid into said inner chamber such that said liquid passes therefrom through said apertures, contacting the inner surface of said metallic plate and being deflected downwardly therefrom along the outer surface of said electrically conductive blade.

9. An electrochemical cell which comprises in combination at least one electrode comprising two vertically disposed and opposing porous side walls and an inner chamber adapted to be fed a fluid reactant, said inner chamber being in communication with the inner surface of said porous side walls, the outer surface of each of said porous side walls being opposed by another electrode, said electrodes being spaced apart from one another by means of an electrically insulating spacer member positioned between and in contact with the upper and lower portions of the electrodes, inlet means within said spacer member for feeding a liquid electrolyte medium to the space between and in contact with the outer surfaces of the opposing electrodes, and outlet means within said spacer member for withdrawing liquid from the space between the outer surfaces of the opposing electrodes.

10. An electrochemical cell which comprises in combination at least three interiorly and vertically disposed frames interconnected by removable securing means, the first of said three frames comprising an anodic electrode and the third of said three frames comprising a cathodic electrode, the second of said three frames being an electrically insulating spacer member interposed between said first and third frames and having a hollow interior for containing a liquid electrolyte medium between and in contact with the outer and opposing surfaces of said anodic and cathodic electrodes, said second frame being provided with a passageway for introducing liquid electrolyte medium to the hollow interior thereof and with a separate passageway for withdrawing liquid therefrom, at least one of said first and third frames comprising two vertically disposed porous side walls with an inner chamber therebetween adapted to be fed a liquid, said inner chamber being in communication with the inner surface of the said porous side walls.

11. An electrolysis cell for electrolyzing an aqueous solution of a metal salt and provided with a cathode comprising amalgam, which comprises at least one vertically disposed cathode means comprising an inner chamber and two vertically disposed porous side walls with said chamber therebetween, said chamber being in communication with the inner surface of said porous side walls and enclosed at the top and bottom by upper and lower cross members, said inner chamber being adapted to be fed a liquid amalgam in contact with the inner surface of said porous side walls, an anode vertically disposed in opposing relationship to and spaced apart from said cathode means by means of an electrically insulating spacer member interposed between and in contact with the upper and lower portions of said cathode means and said anode, a passageway within said spacer member for introducing an aqueous solution of a metal salt to the space between the outer opposing surfaces of said cathode means and said anode, and a separate passageway within said spaced member for withdrawing aqueous medium from the space between said cathode means and said anode.

References Cited

UNITED STATES PATENTS

| 1,000,608 | 8/1911 | Kenevel | 204—269 |
| 1,486,803 | 3/1924 | Ruckman | 136—134 |
| 1,934,945 | 12/1933 | Merlau et al. | 136—134 |
| 1,970,975 | 8/1934 | Palmaer et al. | 204—219 X |
| 2,669,542 | 2/1954 | Dooley | 204—99 X |
| 2,723,230 | 11/1955 | Godsey | 204—286 |
| 2,841,547 | 7/1958 | Kotz et al. | 204—287 X |
| 2,952,604 | 9/1960 | De Nora | 204—220 |
| 3,065,163 | 11/1962 | Honsberg | 204—251 X |
| 3,161,546 | 12/1964 | Yeager et al. | 136—86 |

FOREIGN PATENTS

| 682,574 | 5/1930 | France. |

HOWARD S. WILLIAMS, *Primary Examiner.*

DONALD R. VALENTINE, *Assistant Examiner.*

PO-1050
(5/69)

UNITED STATES PATENT OFFICE
CERTIFICATE OF CORRECTION

Patent No. 3,421,994　　　　　　Dated January 14, 1969

Inventor(s)　　　J.A.M. LeDuc

It is certified that error appears in the above-identified patent and that said Letters Patent are hereby corrected as shown below:

Column 4, line 69, the first occurrence of "is" should read --as--; line 71, for "described" read --describe--. Column 5, line 43, for "reaction proceeds" read --reactions proceed--; line 67, for "walter" read --water--. Column 7, line 17, after "44" insert --,--; line 19, for "raton" read --ration--; line 57, before "chlorine" insert --to operate the electrolysis reaction forming gaseous--. Column 16, line 43, for "chrlorine" read --chlorine--. Column 18, line 9, for "horizonal" read --horizontal--. Column 20, line 45, for "spaced" read --spacer--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents